(12) United States Patent
Lindl et al.

(10) Patent No.: US 12,435,515 B2
(45) Date of Patent: Oct. 7, 2025

(54) COUPLINGS FOR TUBING

(71) Applicant: LINDL&DODGE LLC, Billings, MT (US)

(72) Inventors: James R. Lindl, Knoxville, TN (US); Garrett R. Cox, Knoxville, TN (US)

(*) Notice: Subject to any disclaimer, the term of this patent is extended or adjusted under 35 U.S.C. 154(b) by 855 days.

(21) Appl. No.: 17/648,669

(22) Filed: Jan. 22, 2022

(65) Prior Publication Data
US 2022/0235554 A1 Jul. 28, 2022

Related U.S. Application Data

(60) Provisional application No. 63/141,508, filed on Jan. 26, 2021.

(51) Int. Cl.
| | | |
|---|---|---|
| *E04D 13/076* | (2006.01) |
| *A47L 5/14* | (2006.01) |
| *A47L 5/36* | (2006.01) |
| *A47L 9/32* | (2006.01) |
| *B08B 1/16* | (2024.01) |
| *B08B 5/02* | (2006.01) |
| *E01H 1/08* | (2006.01) |
| *F16L 25/00* | (2006.01) |
| *F16L 27/08* | (2006.01) |

(52) U.S. Cl.
CPC ............ *E04D 13/0765* (2013.01); *A47L 5/14* (2013.01); *A47L 5/36* (2013.01); *A47L 9/327* (2013.01); *B08B 1/165* (2024.01); *B08B 5/02* (2013.01); *E01H 1/0818* (2013.01); *F16L 25/0036* (2013.01); *F16L 27/0812* (2013.01)

(58) Field of Classification Search
CPC ... F16L 25/0036; F16L 25/0045; F16L 25/14; F16L 33/27; F16L 37/20; E04D 13/0765
See application file for complete search history.

(56) References Cited

U.S. PATENT DOCUMENTS

| | | | |
|---|---|---|---|
| 4,750,883 A | 6/1988 | Drake | |
| 5,022,586 A | 6/1991 | Putnam | |
| 5,072,972 A * | 12/1991 | Justice | ............... F16L 25/0036 |
| 5,944,362 A * | 8/1999 | Harle | .................. F16L 25/0036 |
| 6,811,191 B2* | 11/2004 | Mills | ................... F16L 25/0045 |
| 8,690,194 B1* | 4/2014 | Smith | ................. F16L 25/0036 |
| 9,869,413 B2* | 1/2018 | Laakso | .................... F16L 47/22 |
| 10,760,276 B2 | 9/2020 | Lindl | |
| 2004/0080160 A1* | 4/2004 | Rief | ..................... F16L 25/0045 |
| 2004/0143931 A1* | 7/2004 | Dennis | ....................... A47L 5/14 |
| 2011/0132405 A1* | 6/2011 | Lowenstein | ........ E04D 13/0765 |
| 2017/0191272 A1 | 7/2017 | Ashton-Miller et al. | |

* cited by examiner

*Primary Examiner* — Zachary T Dragicevich
(74) *Attorney, Agent, or Firm* — LAW OFFICES OF MICHAEL L. WISE, LLC (57) ABSTRACT

A coupling for a tube includes an attachment and a housing. The attachment is attached to the tube and has a barrel-shaped exterior surface. The housing contains the barrel-shaped exterior surface such that the attachment is rotatable in the housing while not being removable from the housing. The coupling thereby allows easy rotation of the tube within the coupling. The coupling may be utilized to attach the tube to another tube or to another structure.

17 Claims, 8 Drawing Sheets

COUPLINGS FOR TUBING

FIELD OF THE INVENTION

The present invention relates generally to couplings for tubing, and, more particularly, to couplings for tubing allowing the swiveling of the tubing within the couplings.

BACKGROUND OF THE INVENTION

Gutters are conventionally cleaned by getting on a ladder and manually removing the debris. Unfortunately, falls from ladders are quite common, and hundreds of injuries and deaths result every year. Solutions that do not require accessing a gutter by ladder typically involve attaching long tubular flexible-tube attachments to leaf blowers, dry vacuums, or pressure washers.

A solution for making gutter cleaning easier and safer is described in, for example, U.S. Pat. No. 10,760,276 to J. R. Lindl, entitled "Apparatus and Methods for Cleaning Gutters." In this solution, a leaf blower is first attached to flexible tubing, which later transitions into rigid tubing. The rigid tubing terminates in a specialized tubular nozzle design. In use, high-velocity air is sent through the tubing and ultimately propelled through the nozzle into the gutter. Debris in the gutter is swept away by this high-velocity air.

Nevertheless, while advances have been made to the nozzle design for such applications, less attention has been paid to the tubing and couplings that support the nozzle. It is beneficial, for example, that the couplings for the tubing allow the tubing to swivel therein so that the nozzle can be precisely placed into the gutter being cleaned. There is, as a result, a need for new couplings for tubing allowing swiveling of the tubing within the couplings.

SUMMARY OF THE INVENTION

Embodiments of the present invention address the above-identified needs by providing couplings for tubing allowing swiveling of the tubing within the couplings.

Aspects of the invention are directed to an apparatus comprising a tube, an attachment, and a housing. The attachment is attached to the tube and defines a barrel-shaped exterior surface portion centered about a longitudinal axis. The housing defines a first chamber and a second chamber with the second chamber being separate from the first chamber. The first chamber contains the barrel-shape exterior surface portion such that the barrel-shaped exterior surface portion is rotatable in the first chamber about the longitudinal axis while not being removable from the first chamber.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The present invention will be described with reference to illustrative embodiments. For this reason, numerous modifications can be made to these embodiments and the results will still come within the scope of the invention. No limitations with respect to the specific embodiments described herein are intended or should be inferred.

As used herein and in the appended claims, a "barrel-shaped" surface is cylindrical with a radius that gradually increases and then gradually decreases.

Figure 1:
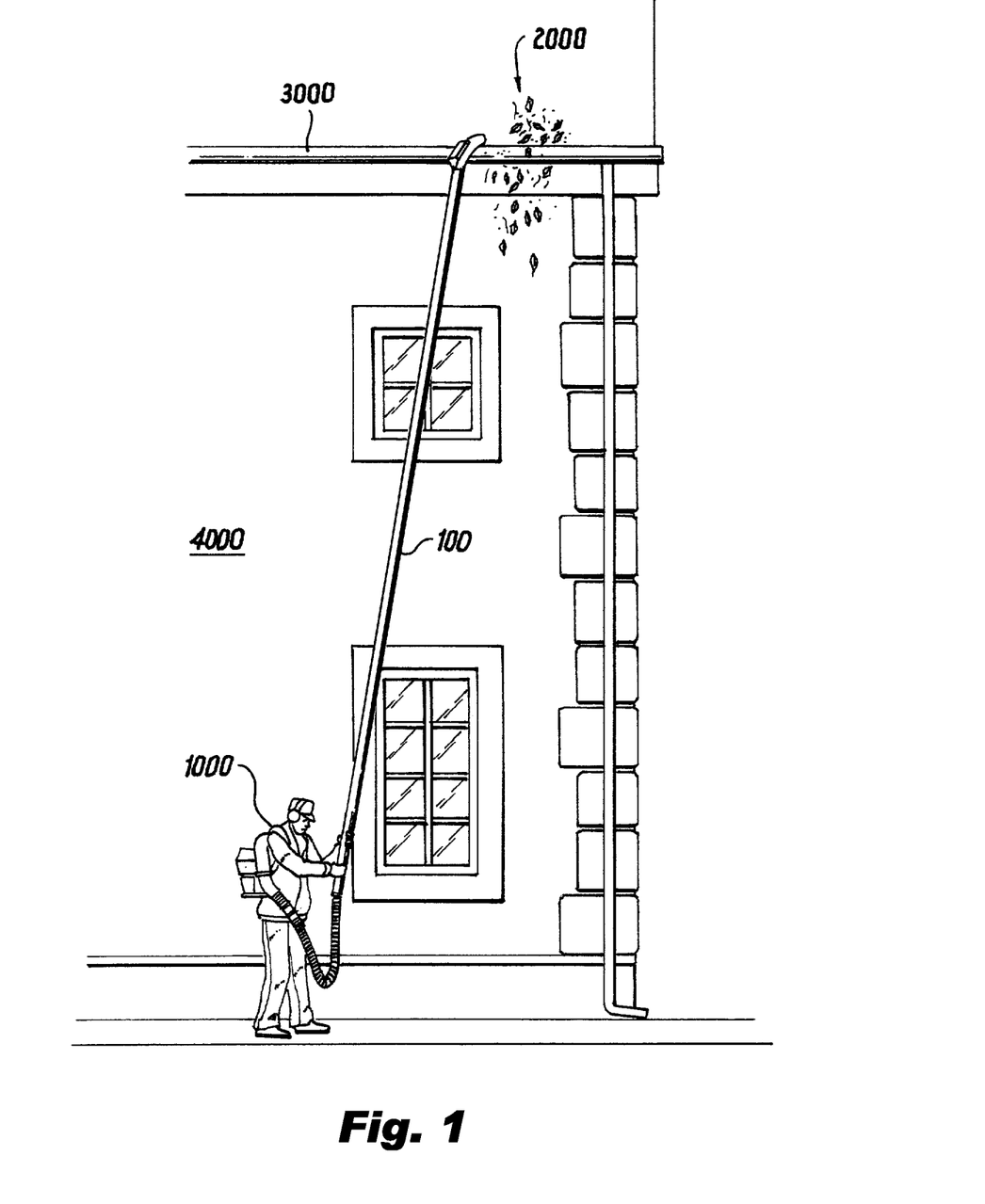
FIG. 1 shows a perspective view of a user using an apparatus in accordance with an illustrative embodiment of the invention to remove debris from a gutter attached to a two-story building.

An exemplary embodiment of the invention involves an apparatus for removing leaves and other debris from rain gutters associated with buildings. FIG. 1 shows a perspective view of a user 1000 using an apparatus 100 to remove debris 2000 from a gutter 3000 attached to a two-story building 4000. The apparatus 100 allows the user 1000 to propel high-velocity air into the gutter 3000 to cause the debris 2000 therein to be expelled from the gutter 3000 and to fall to the ground. There, the debris 2000 can be safely collected and discarded. The gutter 3000 is thereby cleaned while the user 1000 stays safely on the ground, and issues associated with blockages are avoided by effectively cleaning the gutter 3000.

Figure 2:
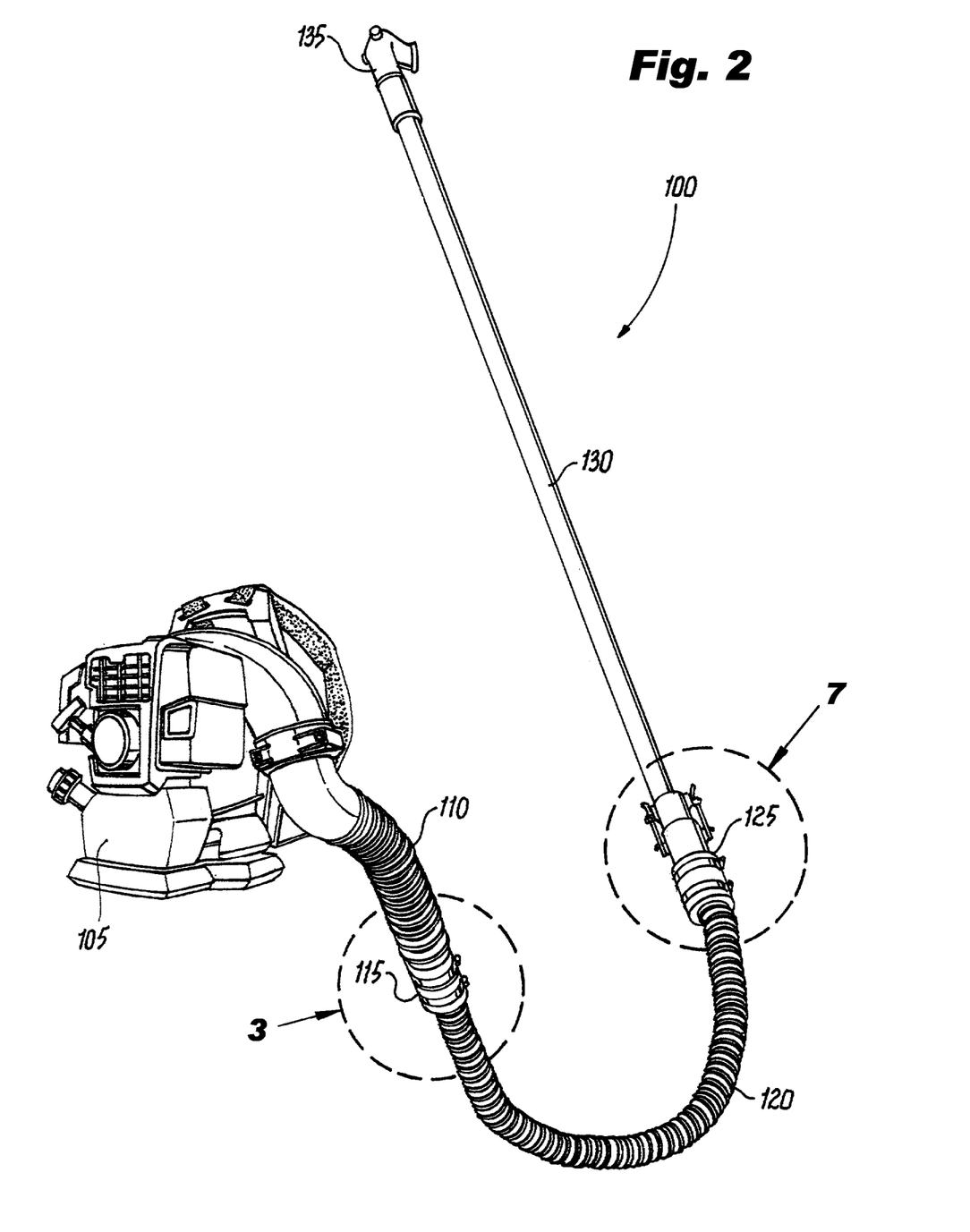
FIG. 2 shows a perspective view of a portion of the FIG. 1 apparatus alone without other added elements.

Additional details of the illustrative apparatus 100 are shown in FIG. 2, which shows a perspective view of a portion of the apparatus 100 alone without other added elements. The apparatus 100 comprises: a blower 105, a bellow tube 110, a bellow-to-flexible coupling 115, a flexible tube 120, a flexible-to-rigid coupling 125, a rigid tube 130, and a nozzle assembly 135. A proximal end of the bellow tube 110 is attached to an output of the blower 105, and a distal end of the bellow tube 110 is attached to the bellow-to-flexible coupling 115. A proximal end of the flexible tube 120 is attached to the bellow-to-flexible coupling 115, and a distal end of the flexible tube 120 is attached to the flexible-to-rigid coupling 125. Finally, a proximal end of the rigid tube 130 is attached to the flexible-to-rigid coupling 125, and a distal end of the rigid tube 130 is attached to the nozzle assembly 135. So configured, an interior of the nozzle assembly 135 is in gaseous communication with an interior of the rigid tube 130, an interior of the flexible tube 120, and an interior of the bellow tube 110. The blower 105 is thereby able to propel high-velocity air through the series of tubes 110, 120, 130 and out the nozzle assembly 135.

As is conventional in many forms of flexible tubing, the flexible tube 120 defines a helical set of ribs 140 on its exterior (i.e., the flexible tube 120 describes an external helix). These ribs 140 maintain the flexibility of the flexible tube 120 while reducing its vulnerability to punctures, tears, and abrasions. While the rigid tube 130 is provided in a single span in the apparatus 100, a plurality of spans of rigid tubing may be strung together if so desired to give the apparatus 100 adjustability with respect to its reach. Compression collars or other fixation means may be utilized to attach one span to another.

Figure 3:
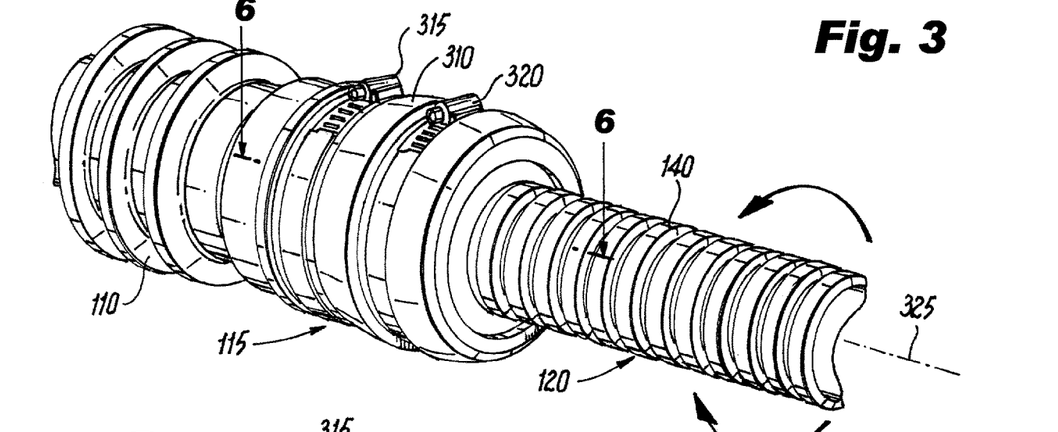
FIG. 3 shows a perspective view of the FIG. 2 elements in the region indicated in FIG. 2.
Figures 4, 5:
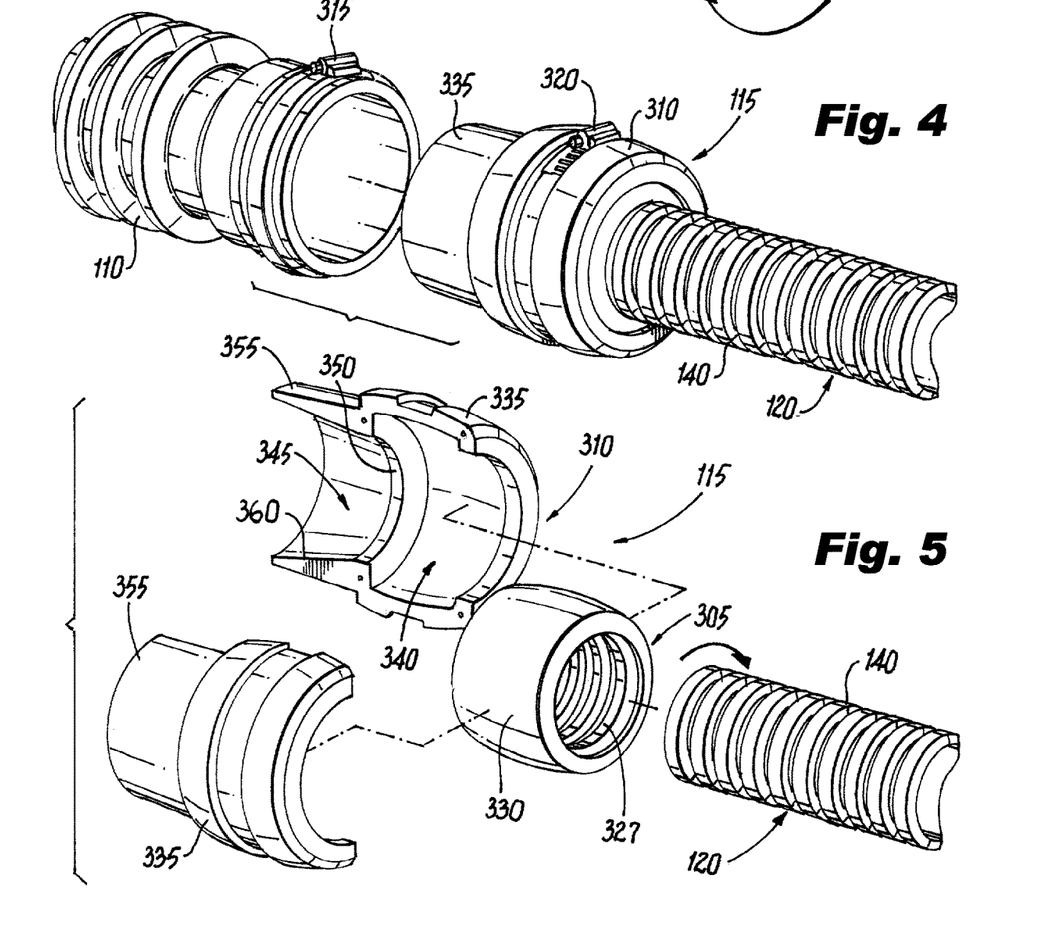
FIG. 4 shows a perspective view of the FIG. 3 elements with the bellow tube separated from the remainder.
FIG. 5 shows an exploded perspective view of the FIG. 3 elements without the bellow tube and clamps.
Figure 6:
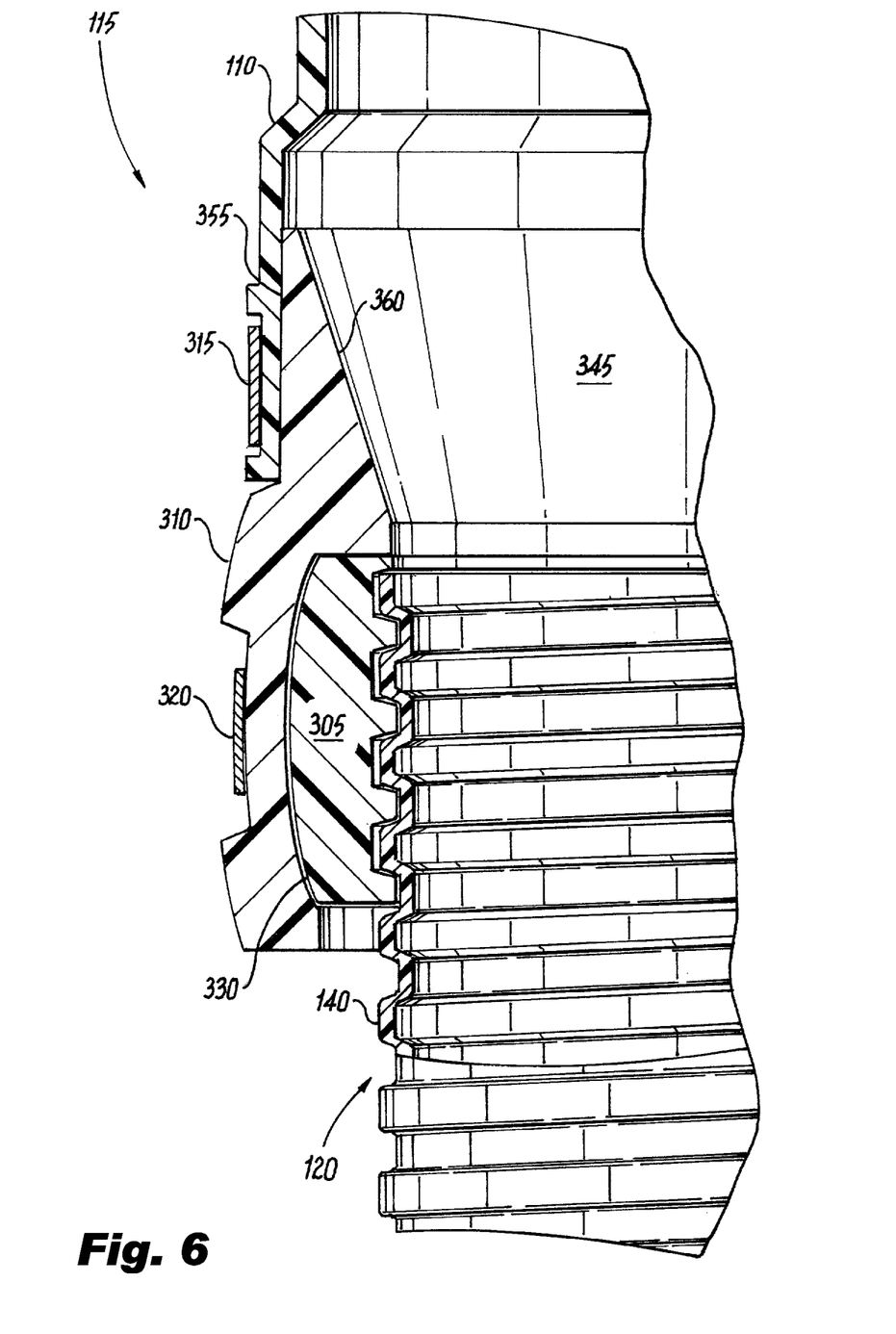
FIG. 6 shows a sectional view of the FIG. 3 elements along the cleave plane indicated in FIG. 3.

The bellow-to-flexible coupling 115 attaches the bellow tube 110 to the flexible tube 120 while allowing the flexible tube 120 to rotate within the bellow-to-flexible coupling 115. The bellow-to-flexible coupling 115 comprises a flexible-tube attachment 305, a bellow-to-flexible housing 310, a bellow-tube clamp 315, and a housing clamp 320. FIGS. 3-6 show aspects of these elements, with: FIG. 3 showing a perspective view of the region indicated in FIG. 2, FIG. 4 showing a perspective view of the FIG. 3 elements with the bellow tube 110 separated from the remainder, FIG. 5 showing an exploded perspective view of the FIG. 3 elements without the bellow tube 110 and the clamps 315, 320, and FIG. 6 showing a sectional view of the FIG. 3 elements along the cleave plane indicated in FIG. 3. A longitudinal axis about which the flexible tube 120 can rotate (i.e., swivel) is indicated in FIG. 3 as a longitudinal axis 325.

The flexible-tube attachment 305 attaches to the flexible tube 120 and is contained inside the bellow-to-flexible housing 310. Internally, the flexible-tube attachment 305 defines internal threads 327, which threadably engage the ribs 140 on the proximal end of the flexible tube 120. Externally, the flexible-tube attachment 305 defines a barrel-shaped exterior surface portion 330 that is centered about the longitudinal axis 325. That is, in accordance with the express definition of "barrel-shaped" set forth above, the barrel-shaped exterior surface portion 330 is cylindrical with a radius that gradually increases and then decreases. The radius is measured transverse to the longitudinal axis 325.

The bellow-to-flexible housing 310 is provided in two separable bellow-to-flexible housing halves 335, which, when mated to each other, are held together by the housing clamp 320 (e.g., a hose clamp). When intact, the bellow-to-flexible housing 310 defines two separate chambers: a flexible-tube chamber 340 and a bellow-tube chamber 345. The flexible-tube chamber 340 is separated from the bellow-tube chamber 345 by a partition 350. The flexible-tube chamber 340 defines an internal volume with a shape essentially inverse to the barrel shape of the flexible-tube attachment 305. The bellow-tube chamber 345 defines a straight-walled cylindrical outer surface 355 and a tapered cylindrical interior surface 360. The flexible-tube chamber 340 is in gaseous communication with the bellow-tube chamber 345 within the bellow-to-flexible housing 310.

In use, the flexible-tube attachment 305 is contained inside the flexible-tube chamber 340 of the bellow-to-flexible housing 310. When contained in the flexible-tube chamber 340, the barrel-shaped exterior surface portion 330 is rotatable in the flexible-tube chamber 340 about the longitudinal axis 325 while not being removable from the flexible-tube chamber 340. At the same time, the bellow tube 110 is attached to the bellow-to-flexible coupling 115 by overlapping the straight-walled cylindrical outer surface 355 of the bellow-tube chamber 345 and being fixed thereto by the bellow-tube clamp 315. The bellow-to-flexible housing 310 of the bellow-to-flexible coupling 115 thereby places an interior of the bellow tube 110 into gaseous communication with an interior of the flexible tube 120, while allowing the flexible tube 120 to be rotated about the longitudinal axis 325.

So configured, the bellow-to-flexible coupling 115 provides several notable advantages in regard to robustness and strength when compared to other designs. More particularly, the barrel shape of the flexible-tube attachment 305 in combination with the inverse-barrel-shape of the flexible-tube chamber 340 tends to distribute forces in a manner unique to this design. Because of the curvature provided by the matching barrel shapes, a force trying to pull or push the flexible-tube attachment 305 out of or into the bellow-to-flexible housing 310 along the longitudinal axis 325 is distributed over a relatively large area of the flexible-tube attachment 305 and the bellow-to-flexible housing 310 rather than being concentrated on smaller areas of each element. At the same time, sideways forces transverse to the longitudinal axis 325 on these same elements are likewise more broadly distributed. Stresses at the bellow-to-flexible coupling 115 are thereby more evenly distributed therein, and the possibility of failures such as cracks and breaks are reduced, even in demanding applications such as that shown in FIG. 1 and even when the parts are made of conventional plastic rather than something more robust.

Figure 7:
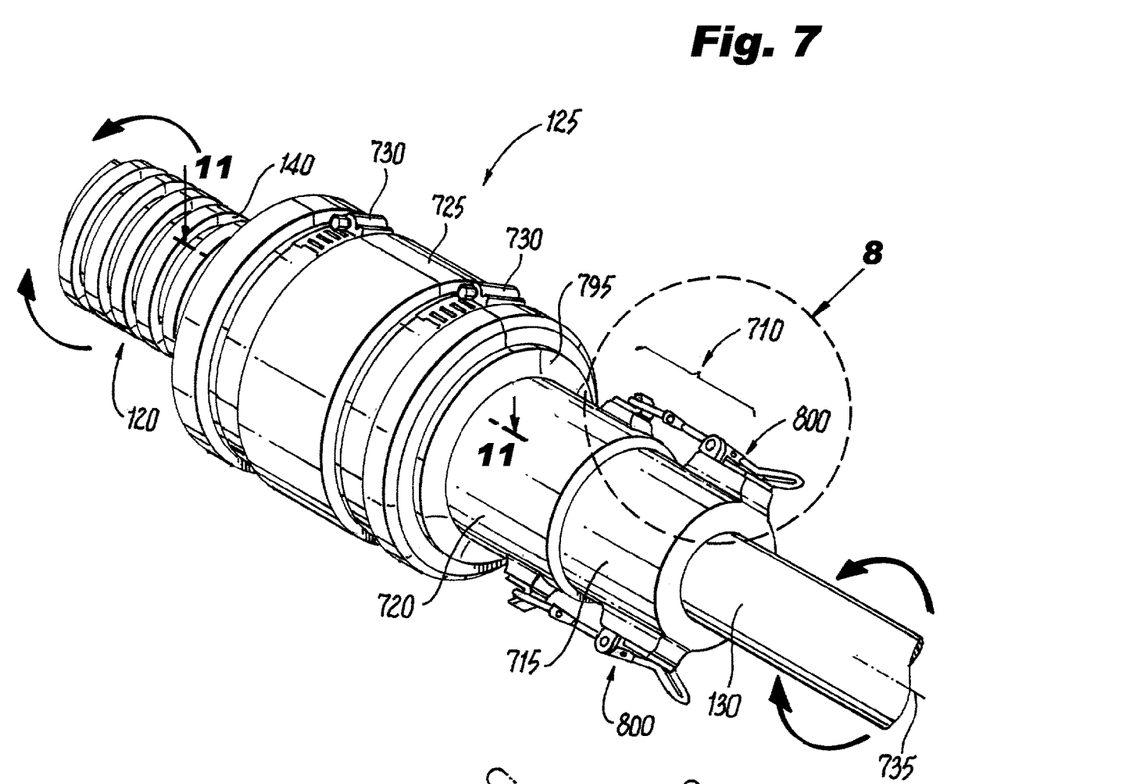
FIG. 7 shows a perspective view of the FIG. 2 elements in the region indicated in FIG. 2.
Figure 8:
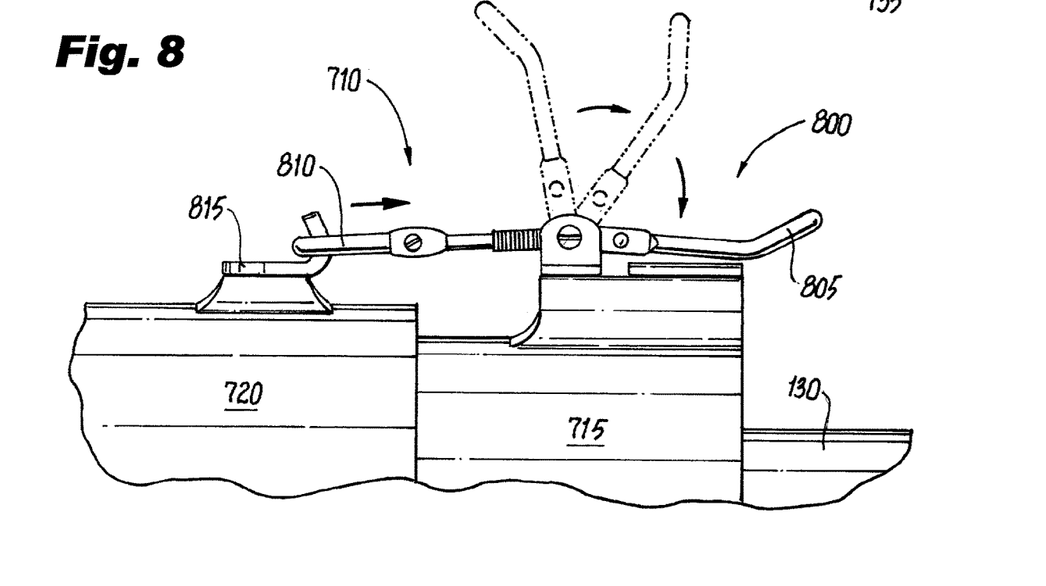
FIG. 8 shows a perspective view of the FIG. 7 elements in the region indicated in FIG. 7.
Figure 9:
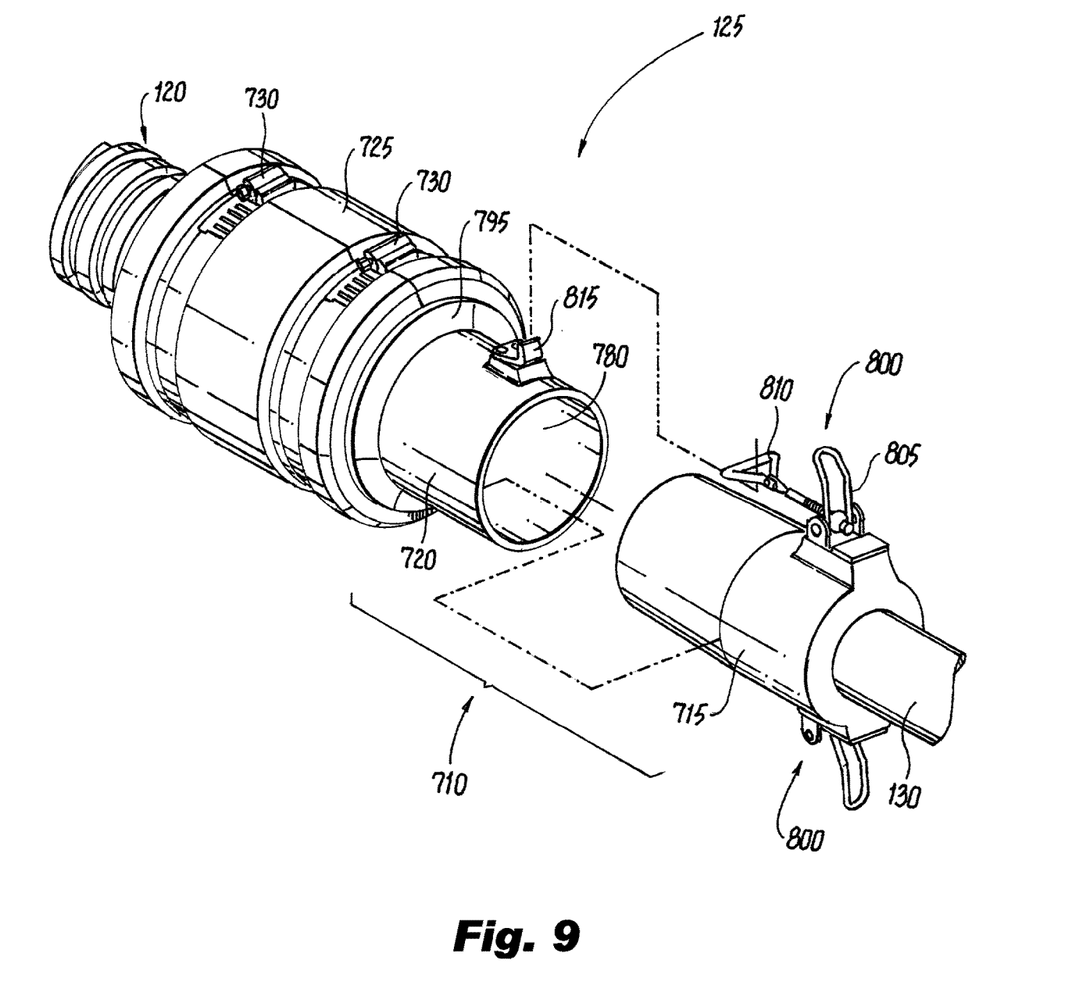
FIG. 9 shows a perspective view of the FIG. 7 elements with the rigid tube and the first attachment portion separated from the remainder.
Figure 10:
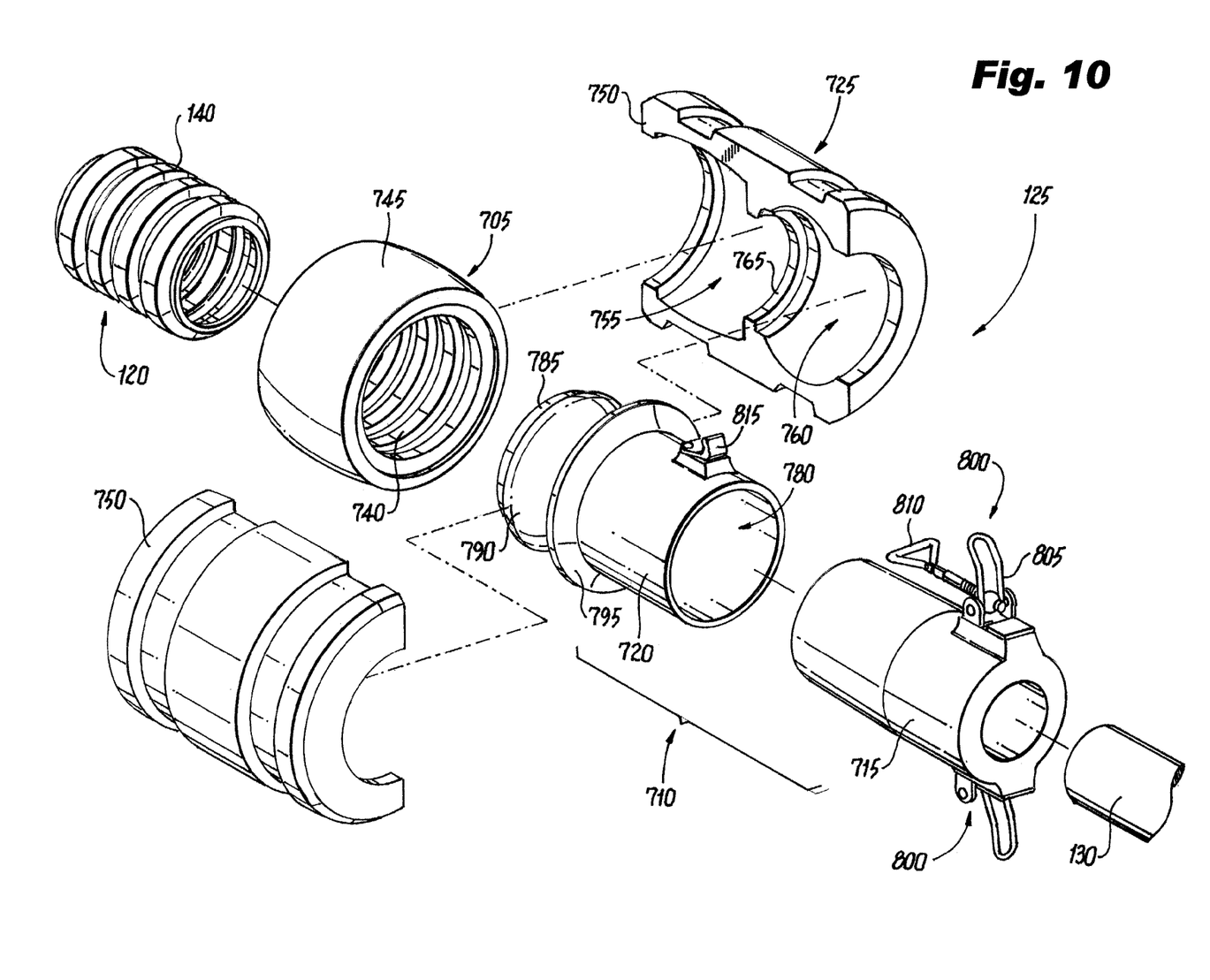
FIG. 10 shows an exploded perspective view of the FIG. 7 elements.
Figure 11:
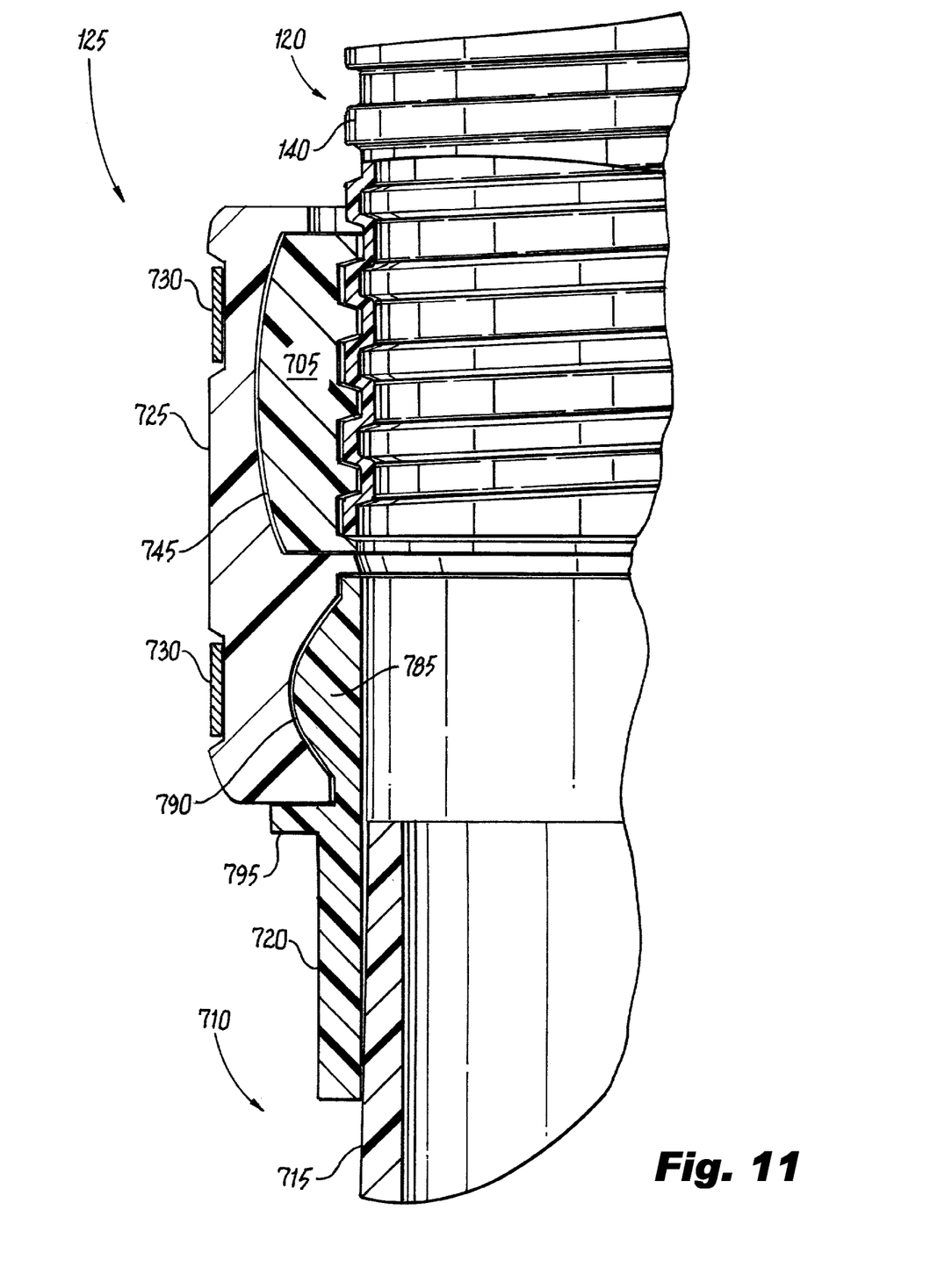
FIG. 11 shows a sectional view of the FIG. 7 elements along the cleave plane indicated in FIG. 7.

The flexible-to-rigid coupling 125 attaches the flexible tube 120 to the rigid tube 130. In so doing, the flexible-to-rigid coupling 125 allows the flexible tube 120 and the rigid tube 130 to both rotate (i.e., swivel) independently within the flexible-to-rigid coupling 125. The flexible-to-rigid coupling 125 includes: a flexible-tube attachment 705, a rigid-tube attachment 710 (comprising a first attachment portion 715 and a second attachment portion 720), a flexible-to-rigid housing 725, and housing clamps 730. FIGS. 7-11 show aspects of these elements, with: FIG. 7 showing a perspective view of the region indicated in FIG. 2, FIG. 8 showing a perspective view of the FIG. 7 elements in the region indicated in FIG. 7, FIG. 9 showing a perspective view of the FIG. 7 elements with the rigid tube 130 and the first attachment portion 715 separated from the remainder, FIG. 10 showing an exploded perspective view of the FIG. 7 elements, and FIG. 11 showing a sectional view of the FIG. 7 elements along the cleave plane indicated in FIG. 7. The longitudinal axis about which the flexible tube 120 and the rigid tube 130 can independently rotate (i.e., swivel) is indicated in FIG. 7 as a longitudinal axis 735.

There are many similarities between the manner in which the flexible tube 120 cooperates with the flexible-to-rigid coupling 125 in FIGS. 7-11 and the manner in which the flexible tube 120 cooperates with the bellow-to-flexible coupling 115 in FIGS. 3-6. The flexible-tube attachment 705 couples to the distal end of the flexible tube 120 and is contained inside the flexible-to-rigid housing 725. Internally, the flexible-tube attachment 705 defines internal threads 740 that threadably engage the ribs 140 on the flexible tube 120. Externally, the flexible-tube attachment 705 defines a barrel-shaped surface portion 745 that is centered about the longitudinal axis 735.

The flexible-to-rigid housing 725 is provided in two separable flexible-to-rigid housing halves 750, which, when mated, are held together by the housing clamps 730 (e.g., hose clamps). When intact, the flexible-to-rigid housing 725 defines two separate chambers: a flexible-tube chamber 755 and a rigid-tube chamber 760. The flexible-tube chamber 755 is separated from the rigid-tube chamber 760 by a partition 765. The flexible-tube chamber 755 is largely identical to the flexible-tube chamber 340 and defines an internal volume with a shape essentially inverse to the barrel shape of the flexible-tube attachment 705. When contained in the flexible-tube chamber 755, the barrel-shaped surface portion 745 is rotatable in the flexible-tube chamber 755 about the longitudinal axis 735 while not being removable from the flexible-tube chamber 755.

The rigid-tube attachment 710 (with its first and second attachment portions 715, 720) and the rigid-tube chamber 760 are new to the flexible-to-rigid coupling 125 and take the place of the bellow-tube-specific portion of the bellow-to-flexible coupling 115 described earlier. The first attachment portion 715 provides the interface between the rigid tube 130 and the second attachment portion 720 and is disposed between the rigid tube 130 and the second attachment portion 720. In the present illustrative embodiment, the first attachment portion 715 defines a hollow-cylindrical sleeve. The proximal end of the rigid tube 130 is inserted into the first attachment portion 715 at one end of the sleeve and is fixated therein by an adhesive or a fastener so as to fixedly attach the rigid tube 130 to the first attachment portion 715. The other end of the first attachment portion 715 removably engages a hollow-cylindrical receiving region 780 of the second attachment portion 720. When inserted into the hollow-cylindrical receiving region 780, the first attachment portion 715 and the hollow-cylindrical receiving region 780 overlap.

In addition to the hollow-cylindrical receiving region 780, the second attachment portion 720 further defines a housing-engagement region 785. Internally, the housing-engagement region 785 is hollow cylindrical. Externally, the housing-engagement region 785 defines a barrel-shaped exterior surface portion 790. An external flange 795 on the second attachment portion 720 is disposed at the transition between the hollow-cylindrical receiving region 780 and the housing-engagement region 785.

To accommodate the second attachment portion 720 of the rigid-tube attachment 710, the rigid-tube chamber 760 within the flexible-to-rigid housing 725 (while intact) defines an internal volume with a shape essentially inverse to that of the housing-engagement region 785, including a barrel shape inverse to that of the barrel-shaped exterior surface portion 790. Once contained within the rigid-tube chamber 760, the barrel-shaped exterior surface portion 790 may rotate in the rigid-tube chamber 760 while not being removable from the rigid-tube chamber 760. Moreover, with the barrel-shaped exterior surface portion 790 contained in the rigid-tube chamber 760, the external flange 795 presses against a face of the flexible-to-rigid housing 725.

Two latches 800 span between the first attachment portion 715 and the second attachment portion 720 and draw the first attachment portion 715 towards the second attachment portion 720. Each of the two latches 800 is a toggle latch and comprises a respective handle 805, a respective loop 810, and a respective catch 815. The handles 805 and the loops 810 of the latches 800 are attached to corresponding lands on the first attachment portion 715, while the catches 815 are attached to corresponding lands on the second attachment portion 720. To use the latches 800, the loops 810 are made to engage the catches 815 and the handles 805 are actuated into an over-center position to draw the first attachment portion 715 and the second attachment portion 720 together. To manually separate the first attachment portion 715 from the second attachment portion 720, the handles 805 are actuated in the other direction to relieve the tension on the latches 800 so that the loops 810 may be disengaged from the catches 815. Attachment and separation of the first and second attachment portions 715, 720 in this manner may advantageously be accomplished single-handedly and with gloves.

The above-described flexible-to-rigid coupling 125 thereby allows the flexible tube 120 and the rigid tube 130 to independently rotate within the flexible-to-rigid coupling 125, while allowing the first attachment portion 715 (and the rigid tube 130) to be manually attached to and manually separated from the second attachment portion 720 and the remainder of the flexible-to-rigid coupling 125. When intact, the bellow-to-flexible housing 310 places the interior of the rigid tube 130 in gaseous communication with the interior of the flexible tube 120. At the same time, the flexible-to-rigid coupling 125 benefits from the use of the barrel shapes in the flexible-tube attachment 705, the second attachment portion 720, the flexible-tube chamber 755, and the rigid-tube chamber 760. Because of the curvature provided by the matching barrel shapes, a force trying to pull or push the flexible-tube attachment 705 or the rigid-tube attachment 710 into or out of the flexible-to-rigid housing 725 along the longitudinal axis 735 is distributed over a relatively large area of these elements rather than being concentrated on smaller areas of each element. At the same time, sideways forces transverse to the longitudinal axis 735 on these same elements are likewise more broadly distributed, while also being mechanically inhibited by the external flange 795 pressing against the flexible-to-rigid housing 725. Stress-induced failures are thereby again mitigated.

The blower 105 may comprise any type of equipment capable of providing a source of high-velocity air, such as a conventional leaf blower or a shop vacuum that is capable of blowing in addition to providing a vacuum. The exemplary blower 105 in FIG. 1, for example, is part of a conventional gas-operated backpack leaf blower, which includes a back unit that provides high-velocity air.

In use, the user 1000 may stand safely on the ground next to the building 4000 and place the nozzle assembly 135 into the gutter 3000 to be cleaned. The user 1000 may then command the blower 105 to propel high-velocity air through the nozzle assembly 135 while manipulating the nozzle assembly 135 in the gutter 3000 to cause the debris 2000 therein to be expelled. During use, the user 1000 may grasp the rigid tube 130 in order to manipulate the nozzle assembly 135 while allowing the flexible tube 120 to drape between the bellow-to-flexible coupling 115 and the flexible-to-rigid coupling 125. The flexible tube 120 may rotate within both the bellow-to-flexible coupling 115 and the flexible-to-rigid coupling 125. The rigid tube 130 may rotate within the flexible-to-rigid coupling 125. These various axes of rotation give the user 1000 maximum flexibility in providing the nozzle assembly 135 with the desired orientation and placement. The user 1000 is not fighting against the lay of the tubes 120, 130 and their inherent resistance to twisting, as might occur without the specialized couplings 115, 125.

Elements of the invention may be sourced from commercial vendors and/or manufactured using conventional manufacturing techniques that will be familiar to one having ordinary skill in the relevant arts. A suitable backpack leaf blower may be sourced from, for example, HUSQVARNA® PROFESSIONAL PRODUCTS INC. (Charlotte, N.C., USA). Flexible and rigid tubing are commercially available from, for example, RIDGID® TOOL COMPANY (Elyria, Ohio, USA). Suitable couplings may be formed of polymer such as polyvinylchloride (PVC) or a fiber-reinforced polymer such as carbon-fiber impregnated polyethylene terephthalate glycol (PETG+CF). Manufacturing techniques for suitable couplings may include, for instance, molding, computer-numerical-control (CNC) machining, three-dimensional (3d) printing, and the like.

It should again be emphasized that the above-described embodiments of the invention are intended to be illustrative only. Other embodiments can use different types and arrangements of elements for implementing the described functionality. These numerous alternative embodiments within the scope of the appended claims will be apparent to one skilled in the art.

For example, while aspects of the invention are described above with reference to an exemplary gutter-cleaning application, aspects of the invention may be utilized in a myriad of other applications that utilize hoses and/or tubing and that may benefit from the added degrees of rotational freedom provided. Other applications may involve, as just a few non-limiting examples, vacuum cleaning, carpet cleaning, septic system maintenance, dispensing of cement, irrigation, fueling, and many others.

Moreover, while the above-described embodiments describe an illustrative coupling that connects a bellow tube to a flexible tube and an illustrative coupling that connects a flexible tube to a rigid tube, other iterations would also fall within the scope of the invention. Additional embodiments falling within the scope of the invention may involve, for example, a coupling that attaches a flexible tube to another flexible tube or a coupling that attaches a rigid tube to another rigid tube. Additional iterations may also involve a coupling that attaches either a flexible tube or a rigid tube to something other than another tube, for example, a tank or vessel.

At the same time, where, in the above-described embodiments, a first tubular structure is described as overlying a second tubular structure, an equally viable design might have the second tubular structure overlie the first tubular structure. It is intended that these additional iterations of the invention would also fall within the scope of the invention.

All the features disclosed herein may be replaced by alternative features serving the same, equivalent, or similar purposes, unless expressly stated otherwise. Thus, unless expressly stated otherwise, each feature disclosed is one example only of a generic series of equivalent or similar features.

What is claimed is:

1. An apparatus comprising:
   a tube;
   an attachment attached to the tube and defining a barrel-shaped exterior surface portion centered about a longitudinal axis, the attachment comprising:
     a first attachment portion attached to the tube; and
     a second attachment portion attached to the first attachment portion but manually separable therefrom, the first attachment portion disposed between the tube and the second attachment portion;
   a housing defining:
     a first chamber containing the barrel-shaped exterior surface portion such that the barrel-shaped exterior surface portion is rotatable in the first chamber about the longitudinal axis while not being removable from the first chamber; and
     a second chamber separate from the first chamber; and
   a latch spanning between the first attachment portion and the second attachment portion and drawing the first attachment portion towards the second attachment portion.

2. The apparatus of claim 1, wherein the second chamber is in gaseous communication with the tube.

3. The apparatus of claim 1, wherein the housing comprises two separable halves.

4. The apparatus of claim 3, further comprising a clamp holding the two separable halves together.

5. The apparatus of claim 1, wherein the tube comprises a flexible tube capable of being bent without breaking.

6. The apparatus of claim 5, wherein the tube defines an external helix.

7. The apparatus of claim 6, wherein the attachment defines internal threads that threadably engage the external helix to attach the attachment to the tube.

8. The apparatus of claim 1, wherein the tube comprises a rigid tube incapable of being bent without breaking.

9. The apparatus of claim 1, wherein the first attachment portion defines a hollow-cylindrical sleeve.

10. The apparatus of claim 1, wherein the latch comprises a toggle latch.

11. The apparatus of claim 1, wherein the second chamber defines a straight-walled cylindrical outer surface.

12. The apparatus of claim 11, wherein the second chamber defines a tapered cylindrical interior surface.

13. The apparatus of claim 1, further comprising:
    an additional tube; and
    an additional attachment attached to the additional tube and defining an additional barrel-shaped exterior surface portion centered about the longitudinal axis;
    wherein:
      the second chamber contains the additional barrel-shaped exterior surface portion such that the additional barrel-shaped exterior surface portion is rotatable in the second chamber about the longitudinal axis while not being removable from the second chamber; and
      the housing places an interior of the additional tube in gaseous communication with an interior of the tube.

14. The apparatus of claim 13, wherein the tube comprises a flexible tube capable of being bent without breaking and the additional tube comprises a rigid tube incapable of being bent without breaking.

15. The apparatus of claim 13, wherein the tube and the additional tube are independently rotatable about the longitudinal axis.

16. An apparatus comprising:
    a tube;
    an attachment attached to the tube and defining a barrel-shaped exterior surface portion centered about a longitudinal axis;
    a housing defining:
      a first chamber containing the barrel-shaped exterior surface portion such that the barrel-shaped exterior surface portion is rotatable in the first chamber about the longitudinal axis while not being removable from the first chamber; and
      a second chamber separate from the first chamber, the second chamber defining a straight-walled cylindrical outer surface;
    a blower; and
    a bellow tube attached to the blower, an end of the bellow tube overlapping the straight-walled cylindrical outer surface;
    wherein the housing places an interior of the bellow tube in gaseous communication with an interior of the tube.

17. The apparatus of claim 16, further comprising a clamp fixating the bellow tube to the straight-walled cylindrical outer surface.

* * * * *